Figure 1:
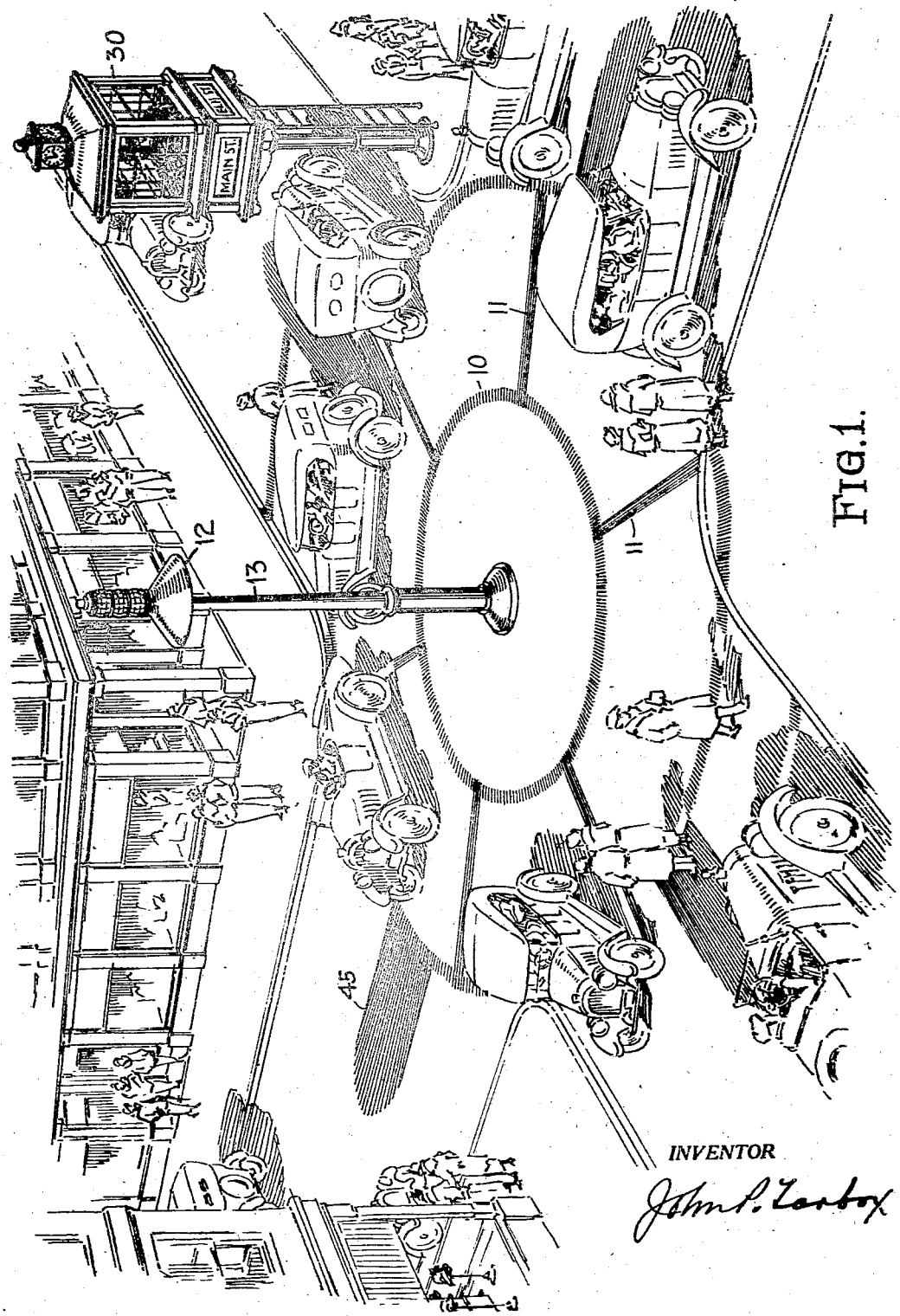

July 1, 1930. J. P. TARBOX 1,769,555
METHOD AND SYSTEM OF CROSSING TRAFFIC CONTROL
Filed May 29, 1924 7 Sheets-Sheet 2
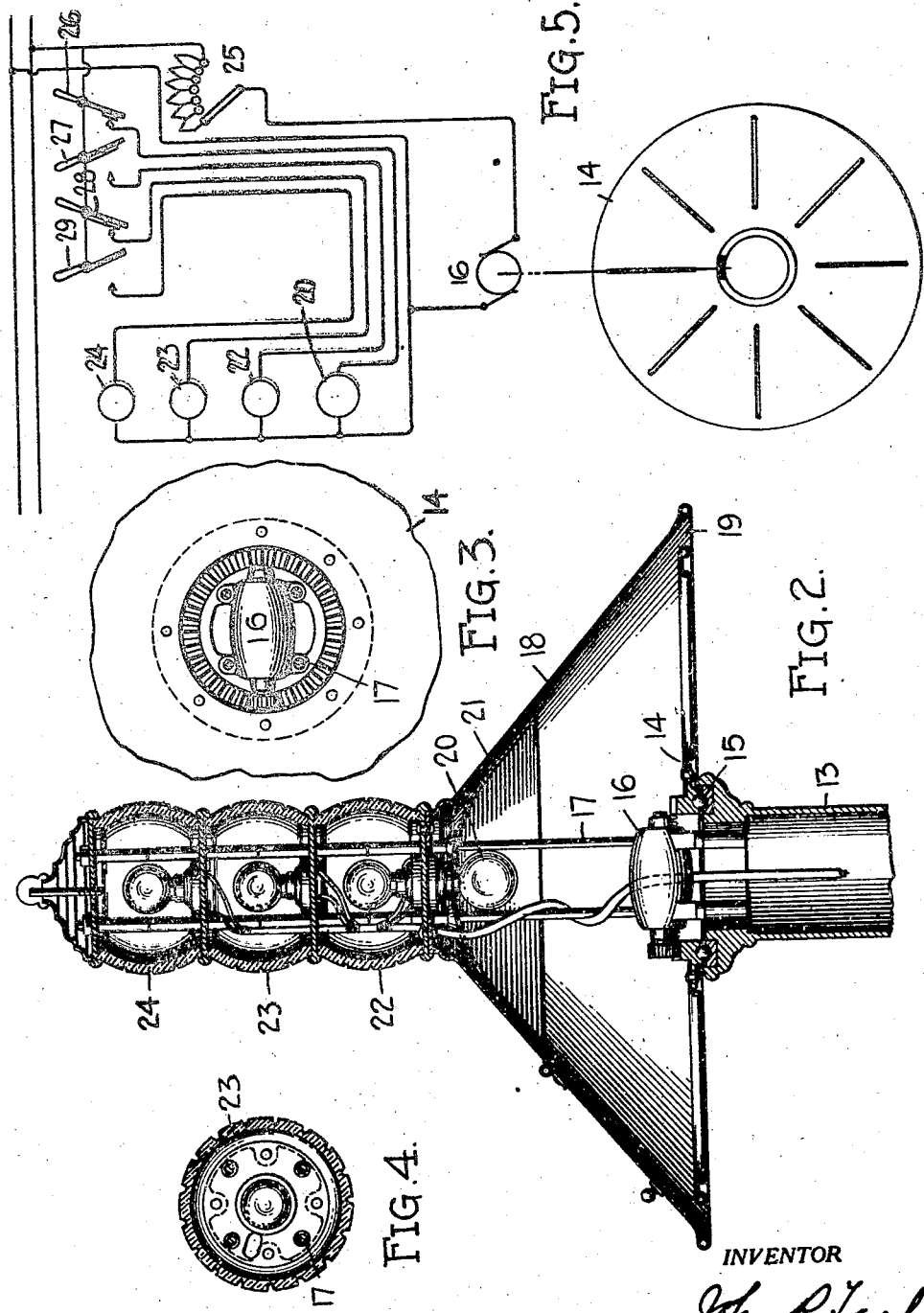
INVENTOR
John P. Tarbox July 1, 1930.  J. P. TARBOX  1,769,555

METHOD AND SYSTEM OF CROSSING TRAFFIC CONTROL

Filed May 29, 1924    7 Sheets-Sheet 3

INVENTOR

John P. Tarbox

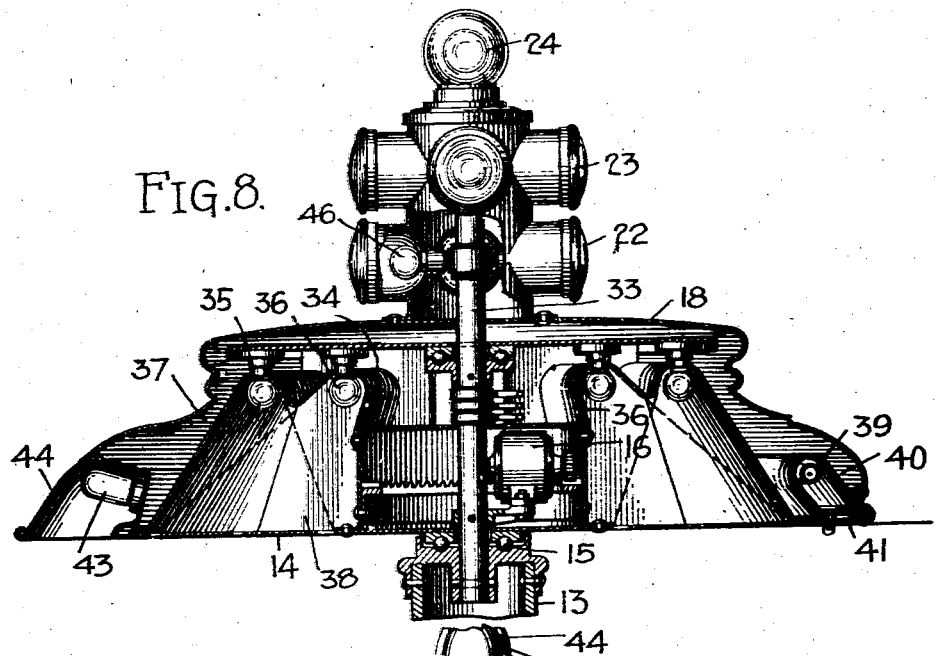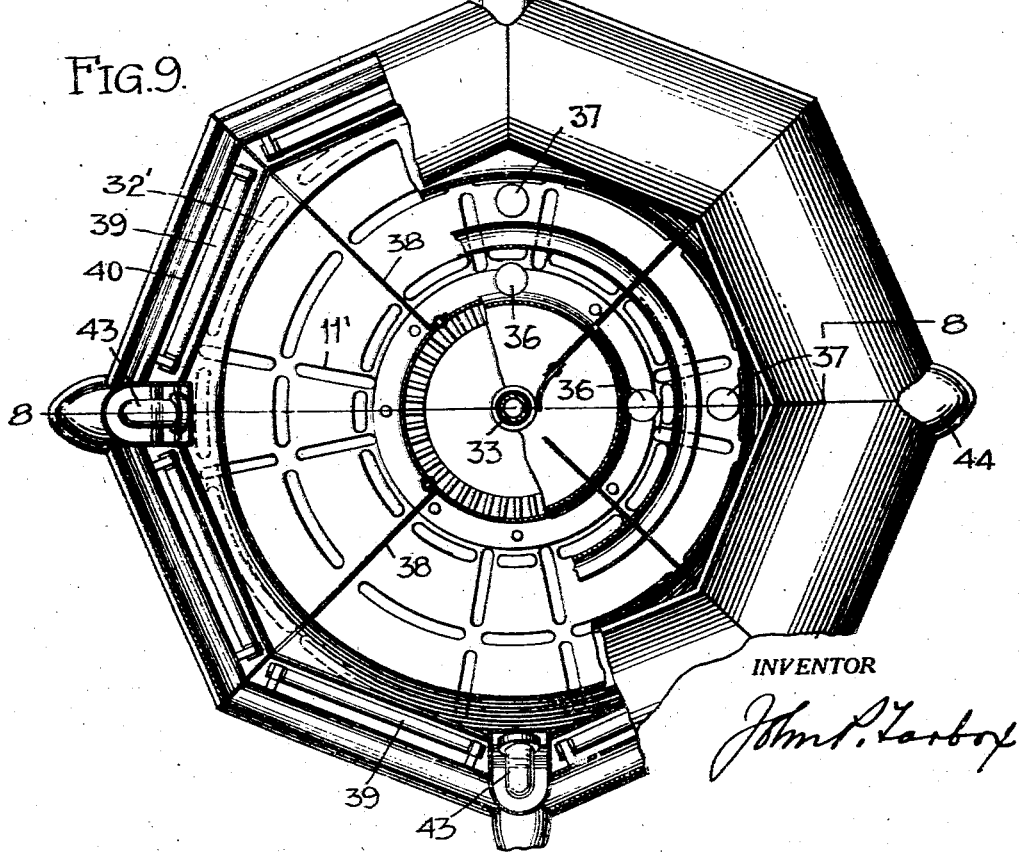

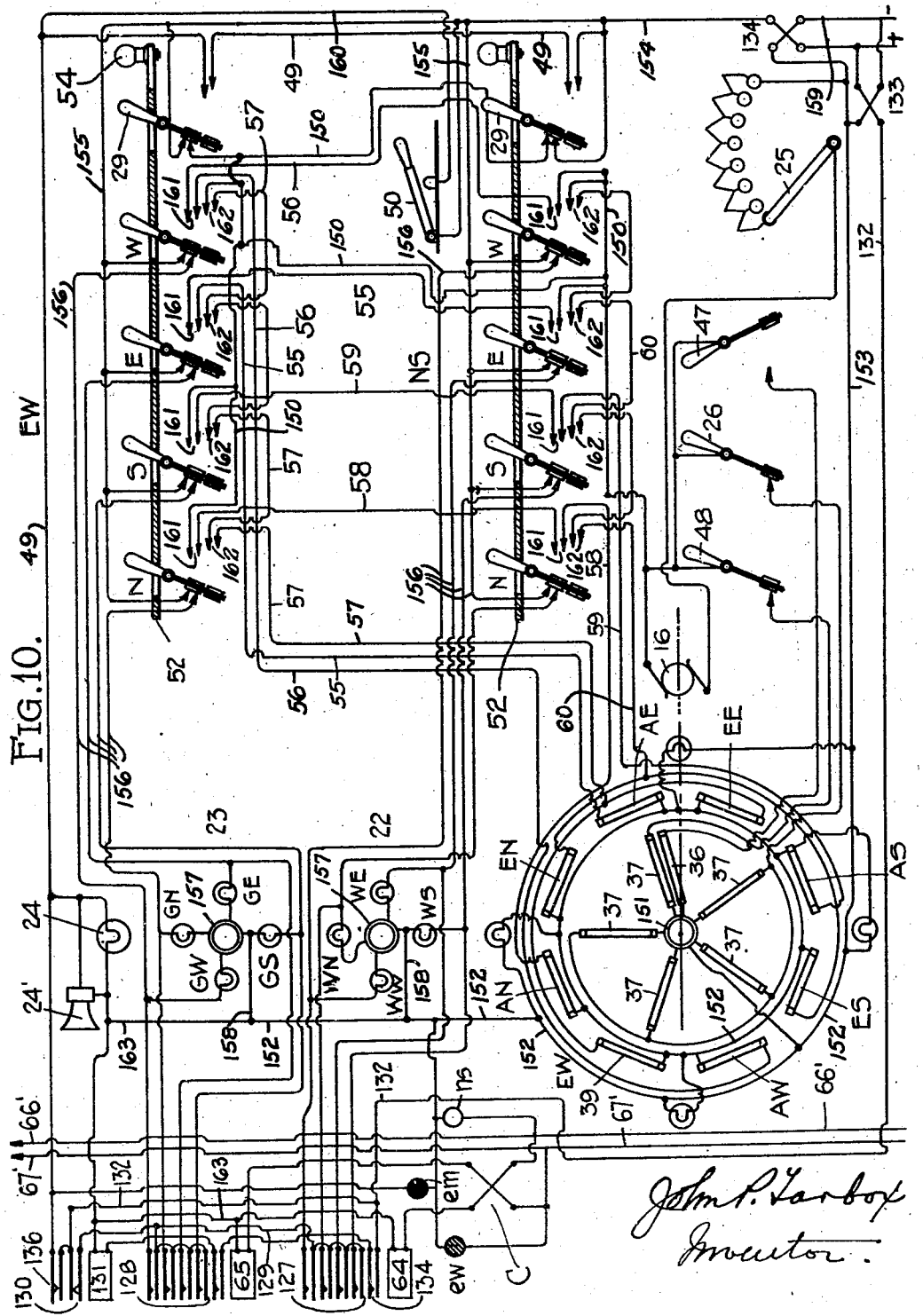

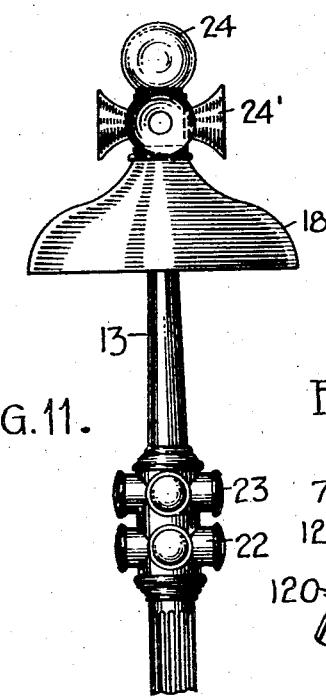
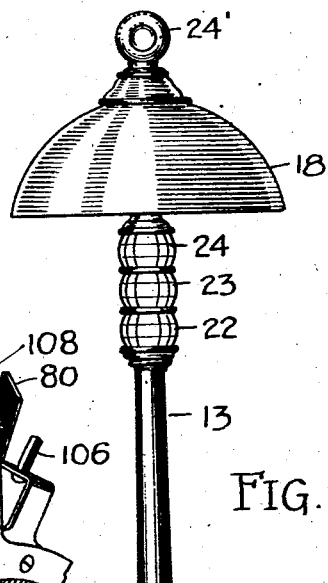
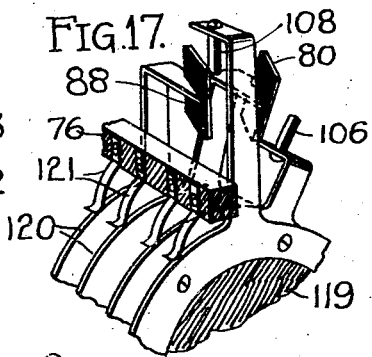
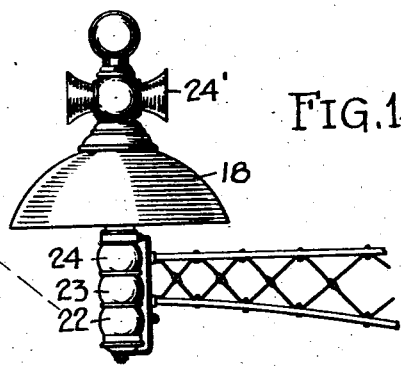
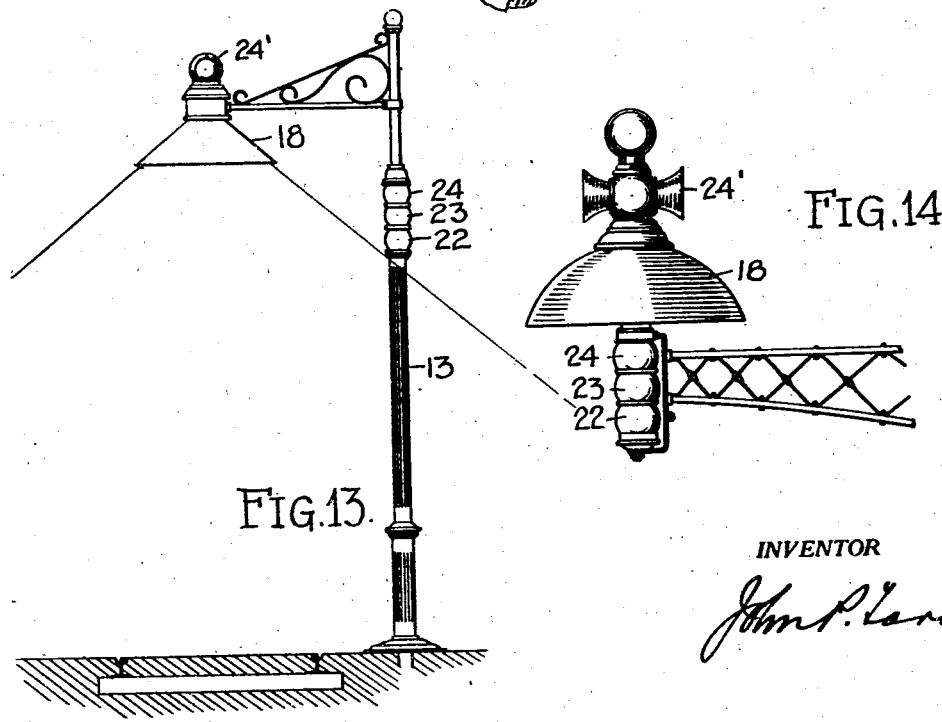

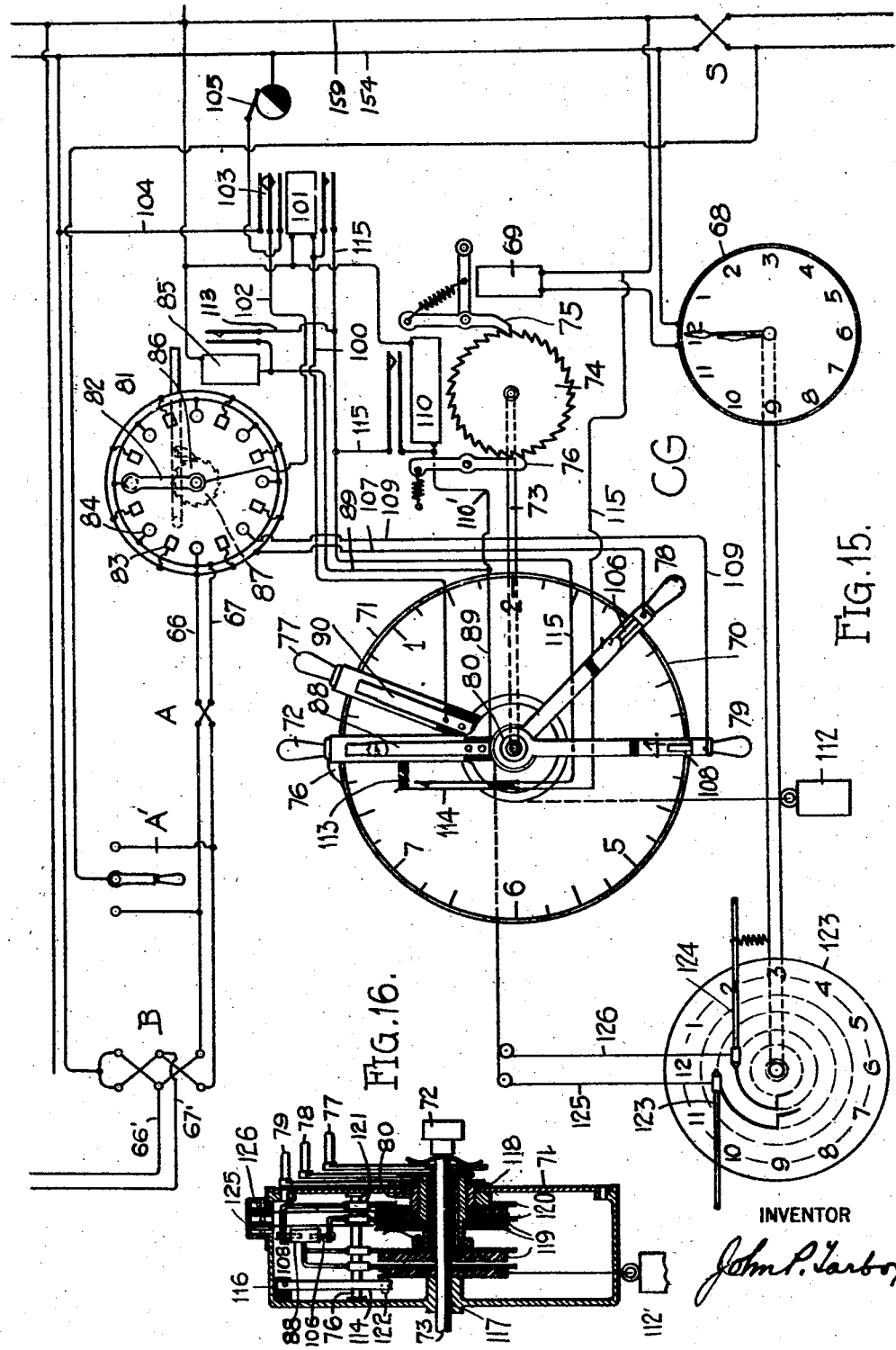

Patented July 1, 1930

1,769,555

UNITED STATES PATENT OFFICE

JOHN P. TARBOX, OF NEW YORK, N. Y.

METHOD AND SYSTEM OF CROSSING-TRAFFIC CONTROL

Application filed May 29, 1924. Serial No. 716,804.

My invention relates to crossing traffic control systems of the order of those employed for controlling street crossing traffic in cities, towns and villages, but more particularly of the order of those used for controlling the heavy traffic of large cities.

An outstanding defect in most, if not all, traffic control systems is the fact that traffic from one approach or from one direction is held up during the entire period during which traffic is permitted to move over the crossing from another approach or direction. Always such delays are expensive, even in the moderate traffic of small towns and villages, but in the larger cities, especially in the largest, as in New York, the holding up of the large volumes of traffic is enormously expensive. The remedy of this defect is the central aim of my invention. Surrounding aims are the institution and preservation of an orderly process of traffic over the crossing, the full control of the rate of speed and volume of traffic, a secondary control over spacing and speeding of cars between crossings, the minimizing of traffic blocks at the crossing, the placement of each crossing upon an operating basis corresponding to its own peculiar conditions, the controlling of the relative proportions of main and cross traffic on principal highways, the establishment of full co-ordination between traffic signals and traffic lines, the providing for the orderly and safe crossing of pedestrians, and the placement in the hands of the traffic officers of a positive control over every approaching and passing vehicle. There are yet many other aims of a major and minor nature.

The central aim of the invention is accomplished by the projecting upon the pavement from an elevated point above the central area of the crossing, of a turntable of light, and providing means under the control of the traffic officer to control the speed of rotation of the turntable so projected. This in and of itself solves the problems of expensive waiting and good order. According to the method of the invention, a car or cars in any approach to the crossing are required to enter empty pockets of the turntable only and to remain in them while passing over the crossing area. The traffic is thus divided into ranks and files as it enters the crossing area and that order is preserved while it passes over the crossing area. The fixing of the number and sizes of the pockets outlined on the pavement determines the depth and spacing of the ranks and files, and the control of the speed of rotation of the turntable outlined governs both the speed and the volume of the traffic.

The surrounding aims of the invention are accomplished thru the variable projection transversely of the approaches of lines of light upon the pavement defining at one and the same time the limits of approach of vehicular traffic and the paths of pedestrian traffic transversely of the crossing. Co-ordinated with the projection of these lines are open traffic signals so arranged that each approach and exit of the crossing is under the individual control of the traffic officer. In furtherance of the method of the invention, the volume of traffic may also be varied by selectively varying the approaches from which the ranks and files are filled, and by varying the character of certain of the pockets of the turntable and assignment of pockets of different character to different kinds of traffic, the relative proportion of each class of traffic may be regulated. Stated from another viewpoint, the proportions of each kind of traffic are determined by apportioning the area of the crossing surface between the different kinds of traffic and progressively rotating the area so apportioned or assigned. By these and other features of the method and apparatus of my invention not only the central aim but each and all of the surrounding aims are attained. Moreover, there results a number of very important incidental advantages as will be more appreciated after the invention is fully disclosed.

Referring to the drawings:

Fig. 1 is a general perspective view of a crossing at which the system of my invention has been installed, Fig. 2 is a vertical sectional elevation of a turntable projecting apparatus and associated traffic signals, Fig. 3 is a plan view of the motor drive for the turntable projecting means, Fig. 4 is a cross section on line 4—4 of one of the traffic signals, Fig. 5 is a diagram of the electrical connections applying to one of the simplest forms of the apparatus of Figs. 2 to 4.

Figure 6:
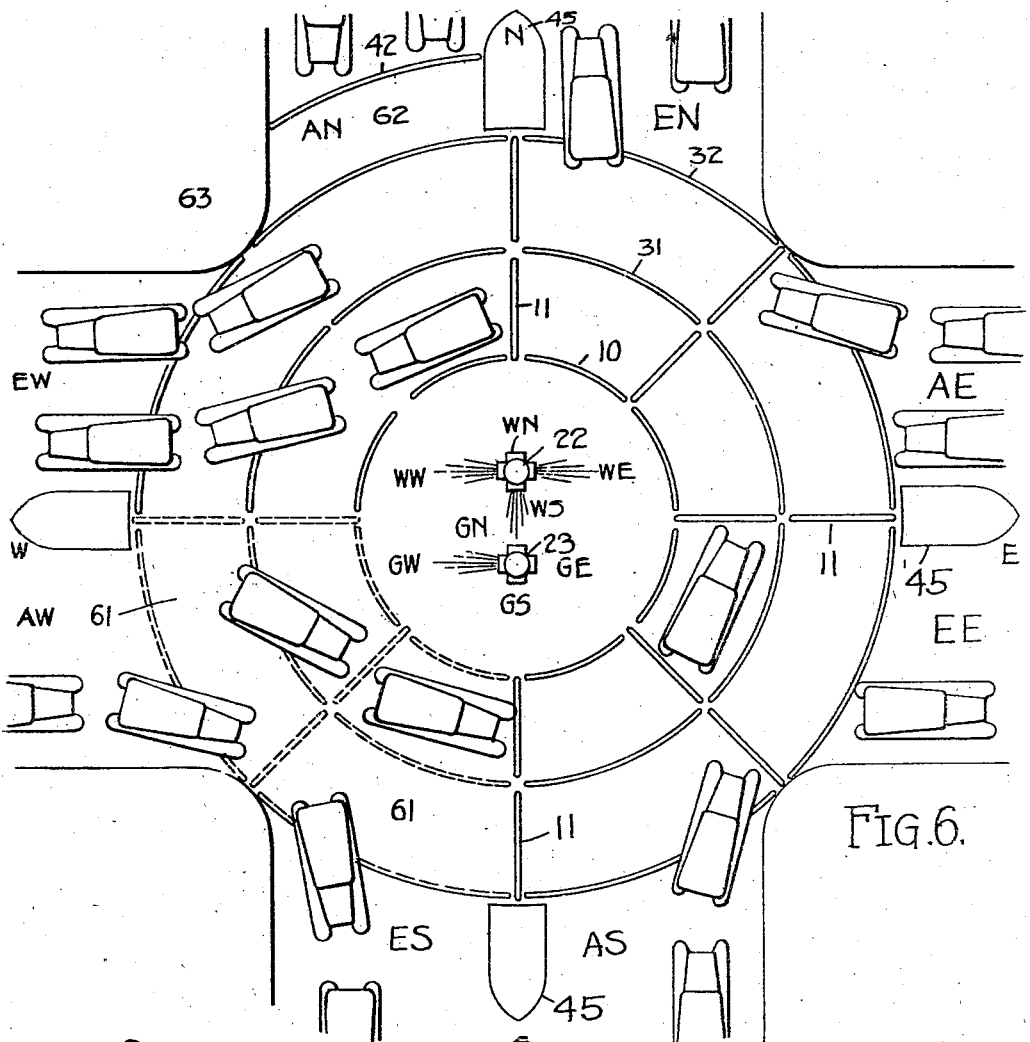
Figure 7:
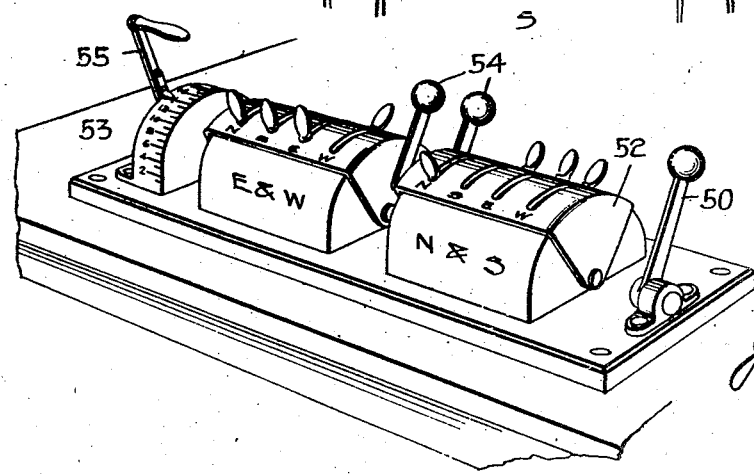

Fig. 6 is a diagram in plan form of a more elaborate turntable and associated system of traffic signals suitable especially for wide streets and main thorofares, Fig. 7 is a perspective of the traffic officer's control switch board of the enlarged system of Fig. 6, Fig. 8 is a sectional vertical elevation of a turntable apparatus and associated signals applying to a large system of Fig. 6, the section being taken on line 8—8 of Fig. 9, Fig. 9 is a plan view with portions of the casing broken away of this enlarged apparatus, Fig. 10 is a diagram of electrical connections pertaining thereto, which diagram discloses in diagram form still another form of turntable apparatus, Figs. 11 to 14, inclusive, are vertical elevations of various proposed designs of turntable apparatus and traffic signal supports adapted to meet the various crossing conditions, Fig. 15 is a diagram showing central station circuits, and Figs. 16 and 17 are cross section and contact detail views of a central station timing device.

Referring to Fig. 1, these is shown projected upon the pavement or other surface of the crossing a turntable of light comprised of an inner circle 10 of determinate diameter and a plurality of equally spaced radial lines or bars of light 11 constituting the arms of the turntable. The diameter of the inner circle 10 is such as to insure a proper turning radius for cars turning at the center of the crossing. The diameter of the turntable at large, as defined by the path of movement of the outer extremities of its arms 11, is such that its circumference, so to speak, is tangent to the street corners 12.

This turntable of light is projected by an apparatus 12 carried upon the upper end of an ornamental column or other support 13 above the central area of the crossing. Referring to Figs. 2 to 4, it will be seen that this apparatus comprises a turntable pattern 14 formed of sheet metal, or of any other material, axially rotatable about the top of the column 13 on ball bearings 15. An electric motor 16 fixed to the top of the column constitutes the means of rotation. Surmounting the column and supported from its top on uprights 17 is a casing 18 of conical or other desired shape, the lower end of which encompasses the pattern 14 but is slightly spaced away from it to leave an annular aperture 19. Also carried by the uprights 17 is a centrally located and powerful source of light 20, together with a reflector 21 which projects a light beam of the full diameter of the lower end of the casing 18.

Supports 17 are extended vertically and carry in super-posed relation surmounting the top of casing 18, traffic signals 22 and 23, and emergency signal 24. Each of these signals is of different character, for example, 22 may be a white light indicating north and south traffic, 23 a green light indicating east and west traffic, and 24 a red emergency light as commonly found in systems in present use in New York city and at other points.

The turntable apparatus and signals are connected as shown in Fig. 5 with a source of power. A rheostat 25 is provided for varying the speed of driving motor 16 of the turntable and switches 26, 27, 28 and 29, respectively, to control the turntable lamp 20 and the traffic signal lamps 22, 23 and 24, respectively. The circuits of these lamps are all alike. A typical one, such as that through the lamp 22, emanates from the power mains at the top of the figure, passes through switch 27 through the lamp 22 itself and back to the mains by the common conductor shown at the left. The circuit of motor 16 emanates from the power mains, passes through the rheostat 25, through the motor itself and back to the power mains by the same common conductor which completes the lamp circuits. The rheostat 25 and the control switches 26 to 29 are all located in the traffic officer's booth. As shown in Fig. 1, this booth, designated 30, is preferably located on one of the street corners and elevated above the plane of the traffic so that the officer has a range of vision covering not only the whole of the crossing area but also the length of each approach to the crossing area.

Assuming now that the turntable lamp 20 and the open traffic signals 22 and 23 have all been lit by the closure of appropriate switches and that the motor is started by proper operation of rheostat 25, and that the rotation of turntable 14 is counter-clockwise viewed in plan, the operation is most simply understood and appreciated.

As they enter the vehicles are organized by the turntable into rank and file order of determinate spacing and that order and spacing are unfailingly preserved during the entire time the vehicles are traveling over the area of the crossing. Thus no matter whether vehicles are going straight thru, north or south, east or west, or turning right or left, or completely about, there is no confusion, small likelihood indeed of collisions, and no blocking whatever due to turning of cross traffic. Nor is there blocking of traffic by slow vehicles since the traffic officer observing the slow vehicle about to enter the turntable merely slows up his motor until it is over the crossing. Pedestrians desiring to cross in the process of traffic have only to watch for an empty pocket when they can cross the avenue as it passes.

Clearly with such a system in operation all lengthy waits at crossings are eliminated, it being necessary for a vehicle to wait only for an empty pocket. With the turntable revolving at a good rate, ordinarily there will be no waiting at all and the waiting under crowded traffic conditions will be but momentary. Thus is the average speed of traffic increased markedly above the average speed now pertaining to the alternate stop and go systems in common use, and the central aim of my invention is realized.

Certain auxiliary advantages also result notably the indirect regulation of traffic in the body of the avenue between crossings. This result comes about by reason of the positive control of the speed of the traffic at the crossing. Assuming installation of such a system as this at each of several successive crossings and a discharge of vehicles from the turntables at a given rate of speed, there is decidedly less likelihood of dangerous speeding between crossings. Moreover, there is a strong tendency to preserve between vehicles the spacing established at the crossing. Still further, the volume of traffic between crossings bears a direct ratio to the speed of the crossing turntables and is under the positive control of the traffic officer. This method of inter-crossing speed, spacing and volume control is also a part of my invention.

Pedestrians, when traffic is light, may cross freely by crossing at the time an empty pocket approaches their path of crossing. Their safety, so long as they are opposite an empty pocket, is assured. In light traffic the rate of speed of the turntable need be but relatively small and such a passage of pedestrians most easy to effect. In cases of heavy traffic, however, the traffic officer can extinguish at will the signal 22 or 23 pertaining to any given approach and exit and thereby stop the vehicular traffic for such period of time as will permit pedestrians to pass.

The approaches are at all times under the control of the signals 22, 23 and 24. In case of railway traffic the officer may use these signals just as are used the stop and go signals in common use, the extinguishing of the green light, for example, stopping traffic east and west, and the extinguishing of the white light for example, stopping traffic north and south. The extinguishing of both the traffic signals 22 and 23 and the lighting of the emergency signal 24, stops all traffic and indicates that traffic should seek the curb until the emergency, such for example as the passage of a fire engine, has been passed.

It will by now have been objected that the turntable of light is visible only by night and that vehicles would have difficulty in entering the turntable at speed. According to my invention I constitute the source 20 of the turntable light and its reflector 21, or their equivalents, of special character which throw upon the pavement beams visible both by day and by night. Of such a character is yellow or gold light and in some cases red light. Yellow or gold light I have discovered is especially brilliant and well defined when cast upon a concrete or asphalt pavement, even in bright sunshine. I have accordingly made this a feature of my invention. There are yet other lights which fulfill these requirements but which do not form a part of the present invention.

Entry to the turntable is accomplished thru another important feature of my invention. The diameter of the inner circle 10 of the turntable is made such that it forces entering vehicles toward the corners of the crossing in order that they may be properly accommodated within the pocket. Because, turned in this direction, vehicles make a tangential entry, they enter with the traffic instead of across it. Even starting from a full stop all present day motors can be accelerated to twelve or fifteen miles an hour within a few feet and a chauffeur observing an empty pocket starts his car moving before the pocket actually reaches him and commences his entry as the front line of light of the pocket reaches his front wheels.

This is the simplest form of my invention. It is capable of many embodiments and I shall describe one of the more complete embodiments, the more especially adapted for the heavier city traffic. This embodiment is intended to govern heavy traffic as diagrammed in Fig. 6, applied to a large crossing. A turntable is in this case composed of eight radial bars 11, an inner circle 10, an intermediate circle 31 and an outer circle 32. Thus there are formed pockets for sixteen cars at one time, the intermediate circle 31 defining the line between an outer car and an inner car in a given pocket. From a standpoint of organization into ranks and files the turntable is designed to organize the traffic at its full capacity into eight ranks of two files each of proper relative spacing. Cars are shown in various positions of entering, passing thru, turning and leaving, and in the westerly exit there is shown a block, which will be treated when the operation of the apparatus is disclosed.

The turntable apparatus for projecting this enlarged turntable is shown in Figs. 8 and 9. As in case of the simple apparatus the transparency pattern 14 is revolved by an electric motor 16 about the axis of the column 13. It is housed within and forms the bottom of the fixed casing 18. The casing 18, however, is carried by a fixed central support 33.

Instead of being fixed within the casing, however, the light source in this embodiment is fixed to and revolves with the transparency pattern 14. Moreover, the light source is not single as in case of the source 20 but is multiple and comprises lamps of different characters. There are two annularly arranged series of reflectors, an inner one 34 and an outer one 35. Each reflector is arranged to cast a beam of such thickness that it covers the entire pattern 14 as shown by the dotted lines in Fig. 8. These reflectors are of different light reflecting qualities so that they reflect different kinds of light from the same light source. Within each reflector as shown, however, is a different kind of light source, that is, within reflector 34 is a source 36, which together with its reflector 34 produces a beam of one color while within the other 35 is a source 37, which together with its reflector produces a beam of another color. So, for example, the inner source 36 may produce a gold or yellow beam and the outer source 37 may produce a red beam. Thus, for example, it is well known that the gold reflector will reflect yellow rays, that the reflectors shrouded with certain colors of glass will reflect light of the color of the glass used.

The space beneath the reflectors is divided into chambers by radial partitions 38 (Fig. 9) which preclude light from one chamber entering the adjacent ones. The light sources 36 and 37 are located on a medial line between the partitions so that their annular dispersion of light is symmetrical. Moreover, the sources being localized on these medial lines, the slots 11' of the transparency pattern defining adjacent radial arms of the turntable are drawn in each chamber near together in order to compromise unequal divergence and equalize the spacing of the turntable arms as projected on the pavement. As shown the partitions 38 are so located that radiation from one light chamber illuminates one whole pocket and parts of adjacent pockets, but obviously the disposition of these pockets, the number of them, the number of the light sources, and the disposition of the slots 11' defining the radial beams of light may be changed at will to limit the illumination from each light source to a single pocket or to a plural number of whole pockets.

The outer casing 18 is horizontally of octagonal section and appears clearly in Fig. 9. Across each branch of the octagon outside of the outermost circle 32 of the turntable pattern, it carries a series of perimetrally disposed light sources 39 within reflectors 40 adapted each to cast a beam of light thru a co-extensive aperture 41 in the casing. This beam of light is directed to the pavement beyond the circle of revolution of the turntable a sufficient distance to form a line of light 42 (see Fig. 6). There are eight such light sources.

At each of four equidistant points on the perimeter of the casing 18, are provided radially extending light sources 43 and reflectors 44 adapted to project beams of light downwardly to areas beyond the circle of the revolution of the turntable and of the general form and location shown by the outlines 45 in Fig. 6.

Surmounting the casing 18 as before, are the traffic control and emergency signals. Instead of being of the usual type, however, visible always thru 360°, these signals are multipled, being composed of a number of parts corresponding to the number of approaches to the crossing. Thus each signal 22 and signal 23 is composed of four parts, each of which contains its own light source 46 and each of which is visible only from the approach to which it pertains. The arrangement of the casings and the bull's eyes of these signals resembles that commonly found in railway signals, but in railway signals there is usually but one light source whereas in this case there are separate light sources. The emergency signal 24 is visible thru 360°.

This apparatus is controlled from the traffic officers box 30 over the system of circuits shown in Fig. 10. The motor 16, as before, is controlled by a rheostat 25. The circuit emanates from a switch 134, passes through rheostat 25, through the motor itself and then back by the common conductors associated with the switches N, S, E, W, which will presently be described. But there are three distinct sets of switches controlling the turntable and traffic signal lamps, respectively. There are three switches in the first or lower set, one numbered 26 controlling the light sources 37, another 47 controlling the associated light sources 36, both of the turntable, and a third switch 48 controlling an individual one of the light sources 37. This control is from the common conductor of switches N, S, E, W, by way of switch 48 for example, lamp 37 through the common conductor of the lamps at the center of their arrangement outwardly to the circumscribing conductor at the left and thence back to the mains by way of switch 134. The light sources 36 and 37 are of different quality as for example, one white and the other red. In other words, they correspond in quality to the quality of the light sources described in connection with Figs. 8 and 9 and Fig. 6.

This leads me to say that the turntable shown in this diagram illustrates still a third modification of the turntable form. The sources 36 and 37 instead of being substantially point sources are constituted line sources by embodiment in tubular lamps instead of spherical lamps. So embodied, instead of locating them on the medial lines of chambers, such as are shown in Figs. 8 and 9, they may be located radially of the turntable pattern itself and in their arrangement actually constitute that pattern. In such fashion that if appropriate reflectors are used the turntable does not need to take the form of a transparency but becomes instead a radial arrangement of tubular light sources. But the arrangement of the circuits is the same in any case, and the separate control of sources 36 and 37, as indicated in Fig. 10, is intended to be illustrative of that pertaining to each modification. By illuminating the light sources 36 in lieu of the adjacent light sources 37, one or more pockets may be given a distinctive color or configuration or otherwise differentiated in quality from other pockets, to indicate clearly for traffic of a different direction just as described for example in Figs. 6, 8 and 9. Only one of the sources 36 is shown but it is to be understood that they may be duplicated in connection with as many sources 37 as may be found desirable so that one or all of the pockets may be changed in color at will. By having an independent control for those light circuits 37 with which are associated light sources 36, as shown, it is possible to obliterate sources 37 in some pockets while retaining it in others thus preserving a portion of the light in a portion of the turntable.

The second or middle group of switches I have designated generally NS indicating that they pertain to the signal governing north and south traffic designated generally 22. The component parts of signal 22 I designate WN, WE, WW, WS, the first letter "W" in each case designating the white character of the signal and the last letter designating the direction of the approach which it controls, north, east, south or west as the case may be. In the group NS I have designated respectively by letters N, S, E, W, respectively, the switches controlling the respective parts of signal 22 according to the direction to which they pertain. The circuits are simple and can be easily followed. Suffice it but to say, that when in the position shown the circuits of the entire multiple signal 22 are closed and the signal illuminated, while open they are moved to the opposite positions the circuits are opened and the signals extinguished. A typical circuit is that of the lamp W—W which extends from power main 154 through common switch conductor 155 through switch W through branch 156 to lamp W—W to common conductor 157 of the group and thence by branch 158 to common conductor 152 and branch 153 extending through switch 134 to the opposite main 159.

The third or upper group of switches I have designated EW indicating that this group controls east and west traffic. The number and arrangement of the switches and their designation corresponds to that described for the group NS. They control the component correspondingly designated parts of the multiple east and west traffic control signal 23, the parts of which following the plan used in connection with north and south signal 22 are designated GN, GW, GS, GE, the letter G indicating the green color of that signal. A typical circuit of the lamp GW is provided with numerals similar to those used in connection with the lamp W—W of the group 22. Identical numerals are applied.

Associated with each switch of these groups NS and EW is an emergency signal control switch 29 arranged thru series circuit 49 emanating from the right of switches 29 to close the circuit of emergency signal 24 when switches 29 are simultaneously operated. A separate control switch 50 for this circuit is connected in multiple to switches 29 through conductor 160. The circuit is from the main 154 through any one of the switches named 29 or 50 through conductor 49 or 160 as the case may be by the continuation of the conductor 49 to the signal lamp 24 and signal horn 24' and thence by branch conductor 163 to the common conductor 152, extension 153 and the opposite main 159.

Moreover, each of the switches EW and NS embodies a reciprocable member 52 co-extensive with the switches and associating them together for simultaneous operation thru a slotted connection with the switch arms. The slots are of such an extent that when the member 52 is in its middle position the walls of the slots do not interfere with the individual movement of the switches as may be desired.

The control apparatus of these several groups of switches and rheostat 25 may be embodied practically in the form shown in Fig. 7. The illustration is self-explanatory except with reference to a few points. Associated with the rheostat arm 25 is an index 53 indicating the speed of the turntable in miles per hour of vehicular travel corresponding to rheostat adjustments. Operating knobs 54 for the members 52 are provided adjacent each other so that both of them may be grasped by one and the same hand for simultaneous operation of both groups of switches, should that be desired. The designation of the groups is marked upon the side of the casing containing the switches in each case. The individual switches of the groups are located sufficiently close to each other to enable them to be operated individually by the respective fingers of one hand, or to be operated in groups by group movements of the fingers. The operating levers of the emergency switches 29 are not shown, being disposed within the casings in this embodiment.

Switches 26, 47 and 48 are not shown in this embodiment but may be placed on the same operating base, should it be so desired, as may be indeed all others required for the operation of the system. Such a control organization places every control within easy reach and manipulation.

Reverting now to Fig. 10, it will be noted that the switches of the groups EW and NS not only control the traffic signals, but also control the lamps 39 which define the lines of traffic 42 across the approaches to the exits from the crossing. In their forward positions illustrated, each of the switches controls a part of the associated traffic signal of the group to which it belongs. In its rearward position each of the switches opens its traffic signal circuit and closes, or partially closes, the circuit of an associated one of the lamps 39. In technical parlance the traffic signals and the approach control signals are by these means "interlocked".

Specifically speaking, switches E of groups EW and NS control over circuit 55 that one of lamps 39 designated AE (meaning the approach on the east), switches W control over circuit 56 a similar circuit of that one of lamps 39 designated AW, and the switches N, S, E and W of group EW control the circuit 57 of the exit control lamps EE (meaning exit east) and EW.

Similarly, the switches N and S of the groups EW and NS control over circuits 58 and 59 respectively the circuits of approach control lamps AN and AS, while four switches of the group NS together control the series circuit 60 of exit control lamps EN and ES.

The circuits 55—56—58 and 59 emanate from common conductor 150 which derives its potential from power main 154 by way of emergency switches 129. Each such circuit is interlocked as between switch groups EW and NS by being subjected to a control at back contacts 161 of corresponding switches in each of the two groups so that it is closed only when corresponding switches are thrown. Each of the circuits 57 and 60 emanates also from common conductor 150. It extends in series through normally open contacts 162 of the switches of its group only. The circuits of all the lamps 39 of the group AN, EW, etc., are connected commonly to conductor 152 through which connection is made by branch 153 to main 159. The circuits are completed through switches 29 in parallel.

So organized the invention may be applied to the control of extremely heavy traffic as illustrated in Fig. 6. The positions of the switches indicated in Fig. 7 are those which will bring about the defining of traffic lines outlined in Fig. 6. The motor control arm 25 is set to regulate the rate of movement of the turntable and resultingly the rate of speed of the vehicles on the crossing at fourteen (14) miles per hour. As indicated by dotted lines, two pockets have been given that special character reserving them and that portion of the crossing area which they represent for east and west or crosstown traffic. It may be assumed that the dotted line bars of light are red, or of some special shape, while the full line bars of light are yellow, gold, or of some other special shape indicating their character as pertaining to the accommodation of north and south traffic. These relations may be changed at will by operating switch 47 or duplicates thereof controlling the special light sources 36. Of the group of switches EW the switch W only is forward, illuminating that part of the east and west traffic signal 23 designated GW. (Three parts are extinguished.) Therefore, only traffic coming from the westerly approach enters the special pockets 61 provided for east and west traffic. This precludes further blocking of the westerly exit EW which has been observed by the traffic officer. Moreover, having permitted this block to extend into the turntable area and across the northerly approach AN, the officer has stopped the entry of traffic from this approach by throwing off switch N of NS. Not only has this darkened the branch WN of the north and south traffic signal 22, but thru the interlock circuit 58 it has illuminated the associated approach control lamp 39 pertaining to this approach and laid down the line of light 42, which not only bars traffic from the turntable but establishes a pathway 62 for pedestrian traffic from the pavement 63 to the illuminated island 45. Observing this pathway pedestrians know that they are safe in crossing. The other three switches S, E, and W of the group N and S are all forward, retaining closed the circuits of the corresponding parts of the north and south traffic signal 22 which they control. Thus traffic from each of the other three approaches, west, south and east approaches, is apprised that the north and south line of traffic is opened to them. No other lines 42 are laid down at this time because the remaining approaches and exits are all open for traffic. However, pedestrians noting an open pocket may cross from curb to island and the reverse by passing along with it. Indeed, if they observe that vehicle in the pocket is not going to turn out at a given exit they may cross alongside of the vehicle. A pedestrian may pass beside it providing the approaching vehicles do not obstruct his pathway. Three parts of the east and west traffic control signal 23 are dark. If now the fourth GW be made dark, with WW not only would there be laid down a line 42 guarding the westerly approach AW, but corresponding lines would be laid down covering the easterly and westerly exits.

The traffic officer can vary these signals and associated lines of traffic at will to suit the varying traffic conditions. Should he desire east and west traffic alone, the forefingers of one hand can be used simultaneously to throw both of the switches of group N and S off. Or, he may use the associated operating knob 54 for this purpose. In a similar manner he can eliminate east and west traffic, and again re-establish north and south traffic by merely operating one knob 54 in one direction and the other in the opposite direction. Should he stop all traffic by throwing both knobs 54 into the off position, drawing them both toward him with one hand, he will not only stop all traffic but thru series circuit 49 illuminate the generally visible emergency signal 34 and sound the emergency horn 34'. Simultaneously all other signals and traffic lines are withdrawn due to the opening of the circuits at switches 29. Pedestrians seeing the emergency signal and hearing the horn should not cross and all traffic within the crossing area should clear out.

The general rules of traffic applying in the system so elaborated should be substantially as follows:

(a) Cars turning to the right must keep near the curb and may enter any open pocket.

(b) Cars turning to the left must enter either pockets exclusively devoted to the direction of the left turn or the mouth of an otherwise open pocket pertaining to any direction of traffic. This simple rule obviates absolutely blanketing of the inside cars on left turns.

Islands 45 midway between curbings and lines 42 combining with the outer circle of the turntable to define zones for pedestrian traffic may likewise be used in connection with the simple installation of Fig. 1, as indicated generally in Fig. 1. To produce this result, it is but necessary to add the apparatus of Figs. 2 to 5, the island and zone lamps 40 similar to those used in Fig. 9 with appropriate circuits.

In Fig. 15 I show a modification of the circuits of Fig. 10 in which the system of my invention is interlocked with the system of the halt and go type, so that a number of the crossing installations in times of extremely heavy traffic, such as may not be taken care of by the turntable, may be connected together and operated as one by the halt and go method. This is simply accomplished by interpolating relays 64, 65 controllable from a central station, CG which relays remove the local control of the signals 22, 23 and 24 and render the signals subject to distant control over the circuits 66', 67', so that a number of successive signals in a given avenue of traffic may be controlled together from a central point at will.

Fig. 15 shows the apparatus which I have devised as a part of my invention for such a central control station, 68 is a chronometer of any standard circuit closing or circuit controlling make. In this case it is illustrated as closing and opening from mains 154—159 at regular intervals periodically the circuit of the stepping relay 69 of the traffic signal timing device 70. This device comprises a fixed disc 71 graduated in minutes and fractions of minutes up to 8 (by way of illustration). Movable in planes parallel to this disc about concentric axes are four contact arms. One of these 72 is fixed to shaft 73 which carries ratchet 74 actuated by pawl 75 of the stepping relay 69. At starting, arm 72 rests against a counter-clockwise stop 76, and it is moved step by step, the steps corresponding fractions of minutes from this stop clockwise when relay 69 is operated by the chronometer 68. Arm 77 is frictionally or otherwise engaged with arm 72 or its shaft 73 to be adjustable manually with respect to arm 72 but when released arranged to be carried step by step along with arm 72. Arms 78 and 79, however, are adjustable about fixed support 80 and frictionally associated with that support and each other so that while angularly adjustable they remain fixed with respect to dial 71 and are not stepped around with arm 72.

Electrically connected with the several arms of the timing device 70 is a signal controlling switch 81 comprising a switch arm 82 moving commonly over two sets of interspersed contacts, the one 83 commonly connected to signal circuit 66 and the other 84 commonly connected to signal circuit 67. Arm 82 is rotatable step by step clockwise by stepping relay 85, pawl 86 and ratchet 87.

In the timing device 70 the stepping arm 72 carries insulated from its body a contact 88 connected by conductor 89 in the circuit of stepping relay 85. Arm 77 carries a similar contact 90 connected by conductor 100 with a relay 101, the function of which is to flash the signals thru a connection of arm 82 of the signal controlling switch 81 by conductor 102 and its alternate contacts 103 to the mains either directly thru conductor 104 or indirectly thru flashing commutator 105. Arm 78 carries a contact 106 insulated from its body and connected by conductor 107 with the contacts of the series 83. Arm 79 carries a contact 108 similar to 106 but connected in this case by conductor 109 with the series 84 of the signal controlling switch.

Arm 72 and contacts 88 in addition to controlling stepping magnet 85 control the release magnet 110 of the timing device 70. This release magnet simultaneously withdraws both the stepping pawl 75 and the holding pawl 76. A weight 112 may then draw both arms 72 and 77 back to normal position against stop 76. In this position projection 113 on arm 72 engages and opens contacts 114 thru which each of magnets 85, 101 and 110 lock up over a circuit generally denominated 115.

While Fig. 15 is diagrammatic in the showing of devices and circuits, in Fig. 16 I show by a transverse section how the arms 72, 77, 78 and 79 and their contacts may be associated together without interference and movement thru substantially the 360° of the timing dial secured. All of the arms and contacts are mounted within a circular casing 116. Arm 72 is given the form of a knob and with arm 77, which it carried frictionally, is supported from an elongated bearing 117 in the body of the casing proper at the back. Arms 78 and 79, however, are independently and frictionally supported in a bearing 118 formed by a ferrule carried in the central opening of the dial 71 itself. The arms communicate by concentric thimbles respectively with insulating discs 119 of similar form which discs support concentrically metal rings 120 which in turn carry the respective contacts 88, 80, 106 and 108. These contacts may indeed be finger-like extensions from rings 120. The ends of the contacts are respectively shaped as indicated in Fig. 17 so that 80 and 88 may pass freely back and forth over the ends of 106 and 108. Connection is made with this group of contacts by brushes 121 which bear respectively on rings 120, which are insulated from each other, carried by a cross bar 76 in the central vertical plane of the axis, and which are respectively connected with the circuits 89, 100, 107 and 109. The brushes are on the near side of bar 76 while the contacts of the group to which they pertain are on the far side. Thus any or all of the contacts may be rotated clockwise away from bar 76 thru substantially 360° until they come into engagement with the several brushes 121. So bar 76 constitutes a stop such as illustrated diagrammatically in Fig. 15, defining the normal position of arms 72 and 77. Contacts 114 are carried by casing 116 and are opened by a pin stop 122 carried on that disc 119 associated with contact 88 and arm or knob 72.

Reverting again to Fig. 15, it will be seen that the chronometer 68 also drives a recording device 123 which may carry in the usual course a sheet of recording material on its face laid off into 12 divisions corresponding to the hours of the day as is usual in time recorders.

Within the twelve circumferential divisions into hours of the day, the record carries a plurality of annular divisions into minutes according to the number of minutes represented on the dial 70 with which it is associated. Thus from zero minutes at or near the center of the sheet there are serially arranged eight annular divisions in the illustration taken. Playing over the face of this record sheet are two recording pens 123, 124, the one connected by cord 125 with that disc 119 on which contact 108 is mounted and the other connected by cord 126 with that disc 119 upon which contact 106 is mounted. Pens 123, 124, being drawn toward zero position by suitable springs, it will be seen that with proper dimensions of connections, the pens will be drawn downwardly to those annular graduations indicative of the positions to which arms 78 and 79 are set. So set they will trace upon the record sheet throughout the day the settings which arms 78, 79 are given at various times, making a complete record of the signal operations.

Conductors 66, 67 leading from the interspersed groups of contacts 83, 84 associated with the respective arms 78, 79, are extended thru double pole switch A and double pole double throw switch B, both located at the control station of Fig. 15, unto the signal mains 66', 67' which extend to the local stations in parallel. The switch A serves merely to open the signal lines. The switch B serves not only to open them but to connect them commonly when opened to the same side of the source of power, we'll say the positive side. When the signal lines are disconnected at switch A, however, they may be independently and separately connected to the source of power by a single pole double throw switch A' which is normally open and arranged to connect with the source of power back of the control station switch S.

In the local stations thru which the control line 66', 67' pass, as diagrammatically shown in Fig. 14, these signal lines connect directly thru a local control double pole switch C with the local cut in and cut out relays 64, 65 previously mentioned. The opposite side of these relays connect with the common conductor 163 and by way of conductors 152 and 153 to main 159. Relay 64 carries a bank of four contact pairs 127 normally opened as indicated but closed when the relay is energized to close the circuits of the several lamps of the signal 22 to the source of power in parallel to circuits 156 but independently of the local traffic officer's control switches EW and NS. Relay 65 carries a similarly arranged and operated group of contacts 128 to connect the lamps of signal 23 to the source of power. Connection to the source of power in each case is made by way of common conductor 129 which extends thru the normally closed contact 130 of a relay 131 to conductor 132 which can be traced to the source of power thru a switch 133 associated with the switch 134 which is the main switch of the local station.

The circuit of relay 131 is jointly controlled by relays 64 and 65 thru contacts 134 and 135 in such manner that relay 131 is energized when relays 64 and 65 are pulled up at the same time. In such case contact 130, thru which the lamp circuits of signals 22 and 23 are connected to the source of power, is opened and normally opened contact 136 is closed connecting signal 24 to the source of power.

Normally connected between the signal line

66', 67' and common conductor 152 are three pilot lamps, the one *ns* indicating the operation of north and south traffic signals, another *ew* indicating the operation of east and west signals and a third, *em* indicating the operation of emergency signals.

The system so organized may be used under either local or central station control at will. During the quieter hours of traffic each day the operation will be under local control. During certain rush hours, however, the connected series of stations will be operated under central control. Assuming operation to be proceeding under local control as heretofore outlined, and the rush hour to have arrived, the officer at the central station in order to undertake control of the series of stations at his command proceeds as follows. First, he sets arms 78, 79 and 77 in accordance with the number of minutes he desires to allot, north and south, east and west and warning signals, at the particular hour. In setting these arms, arm 72 is held by hand against the stop 76 so that it may not be drawn frictionally out of position when arm 77 is set. Next the motor which drives commutator 105 is started, tho this motor may be connected directly across the mains and started when power is put across the mains later. Thirdly, switches A and B opened during local control are closed to connect the signal lines 66', 67' to the signal control mechanisms. Fourthly, the switch S throwing on the power is closed.

Placing power on the mains places power by way of conductor 104, contact 103, conductor 102 on the arm 82 of the signal switch and thru it on conductor 66 connecting with signal main 66'. This lights up pilot lamps *ns* in each of the several local stations and immediately apprises the officers at the local stations that the time for central control has arrived and that the central office is operating its control. The local officer may or may not at the moment be ready to shift from local to central control due to local traffic conditions which he alone is in a position to observe, such for example as a traffic jam in one direction or another or a certain congestion which must be relieved. But having observed the pilot signal it then becomes his duty to so regulate the conditions at his crossing as to, at the earliest possible moment, harmonize with the control from the central station which from this time on is manifest upon the pilot lamps *ns* and *ew*. From this time on, as long as the central station continues its operation, these pilot lamps will indicate its functioning precisely, first the white lamp flashing, then the green lamp, etc. Having relieved any special traffic condition which may have existed by special manipulation of his local switches, the officer having reference to the pilot signals then either operates his local switches in gang in substantial synchronism with the central station signals on the pilot lamps until traffic is adjusted approximately thereto or else opens all his local station switches including switch 134. He then closes switch C which until now has been open, thereby connecting relays 64 and 65 to the signal main 66', 67'. Then in addition to the pilot lamps, whenever power is placed upon either signal main, the corresponding signal 22 or 23, as the case may be, is operated as a whole, each lamp in it being illumined. Thus at the time the pilot lamp *ns* is illumined relay 64 which controls signal 22 governing north and south traffic is energized. From this time on the local officer is expected to retain all of his local switches in off positions and to retain closed switches 133 and C having to do with the central station control.

Reverting now to the central station at which control has been inaugurated, as soon as switch Sw was closed, stepping magnet 69 started stepping arms 72 and 77 of the timing device towards arms 78 and 79. This stepping continues once each second or several sections as may be desired, the arms being held in step position by retaining pawl 76 until arm 72 reaches arm 79, the arm which indicates the time allotted for north and south traffic. In the meantime, however, contacts 80 and 88 have successively passed over contact 106 carried by arm 78 by which the time allotted to east and west traffic is controlled. But this passage is of no effect, since contact 106 is at the time disconnected from the source of power, arm 82 of the signal switch being at the moment associated with the complemental group of contacts 84. The moment contact 90 of arm 77 reaches contact 108 of arm 79, power is applied thru arm 82 connected by conductor 109 with contact 108 to the commutator relay 101 connected by conductor 100 with contact 90. This shifts the connection of signal switch arm 82 from direct connection with the source of power to indirect connection therewith thru commutator 105. This shift may be made thru make before break contacts if necessary or other equivalent device to insure the full pulling up of relay 101. Relay 101 having pulled up locks up by conductor 115 thru the now closed contacts 114 to the source of power. Therefore, for the interval of time represented by the angle distended between arm 77 and the following arm 72, the north and south signals displayed at the various local stations, that is the signals 22, will be flashed in a characteristic manner instead of being displayed continuously. This is the indication to traffic that a signal is about to change, an indication corresponding to the present red lamp signals which are in common use for the same purpose. I, too, may use a red lamp so displayed, but I prefer to reserve the use of the red lamp entirely for use in cases of emergency.

When contact 88 of arm 72 reaches contact 108 after this change interval, power is applied by conductor 89 from contact 108 to stepping magnet 85 of the signal switch 81. This steps arm 82 off the group of contacts 84 and onto the group 83. This takes power off of the main 66', de-energizes all of the relays 64, energizes instead the relay 65, shifting from the north and south signals 22 to the east and west signals 23. This shift takes place the moment arm 82 is shifted. Arm 82 and the spacing of contacts 83, 84 being properly proportioned, there need be no over-lapping of signals and no simultaneous energization of relays 64, 65 associated with the emergency signals. And the locking contacts of stepping relay 85 being adjusted with sufficient closeness, operating independently of the stepping operation if need be, the stepping is full, complete and exact for then the energization of relay 85 is not interrupted by the stepping of arm 82 thru which it receives its initial power and which it in turn controls. There are many devices known to the art for adjusting such conditions and I contemplate using any of them which the situation may require. So, the traffic signals are set now for east and west traffic.

Relay 85 locks up over circuit 113 and thru contacts 114 just as did commutator relay 101. When 88 and 108 contacted, however, in addition to closing the circuit of stepping magnet 85, they closed also the circuit of release magnet 110 by conductor 110' connected with the stepping pawl 75 and the holding pawl 76. This magnet too locks up over circuits 114, 115 releasing both pawls. Instantly the weight 112 associated with the arms 72, 77 draws these arms back toward the stop 76. Contacts 88 and 80 in succession ratchet over contact 106 now connected to a source of power, but by reason of the inclination of the ends of contacts 80, 88 (see Fig. 17) and the insulation of the undersides thereof, they do not effect electrical contact with contact 106 so that no circuit is closed thereby and the east and west signals 23 continue to be displayed. Just before arm 72 reaches stop 76, pin 122 associated with contacts 114 engages the longer of these contacts and moves it away from the shorter, opening the locking circuits of all of the relays of the control mechanism. This gives the mechanism a fresh start, which it takes immediately, stepping magnet 69 and holding pawl 76 again cooperating. This time when arm 77 reaches arm 78 controlling the east and west signal, the device having been stepped thru the arc representative of the time allotted to east and west traffic, contacts 90 and 106 place power on commutator relay 101 and the east and west signals are flashed indicating the change in the same manner as were the north and south signals 22. Immediately following the interval of change contact 88 contacts with 106, power is placed on stepping relay 85 which this time steps the control arm 82 back to the group 84 which controls the north and south signals over line 66' and traffic is changed again to north and south traffic.

At the same moment release magnet 110 is again closed, and arms 72 and 77 are drawn back toward normal, without this time having stepped so far as arm 79, the time allotted east and west traffic being less than that allotted north and south traffic. So only contact 80 ratchets past contact 106. This passage, however, is doubly of no effect for not only does contact 80 ratchet pass on its reverse or insulated side, but also arm 106 has by this time been disconnected from the source of power thru the stepping of arm 82.

The central station circuits and electric signal controller of the central station are the subject of a divisional application, Serial No. 361,526, filed May 8, 1929.

The invention is capable of many other modifications. Among the lesser modifications may be mentioned the use of special color for the change of traffic signal, such as red or other, instead of flashing. Instead of operating the approach and exit line lights, AE, AW, etc., from the control switches direct, they may be operated thru relays, and in this connection in case of a display of the emergency signal stopping all traffic, there may be used a relay in parallel with the emergency signal, which relay extinguishes all of the approach and exit line lights or at least the outer ones of them whenever the emergency signal is operated, whereby pedestrians are not led to cross the approaches by the normal appearance of the lines in disregard of the emergency signal.

As to modifications of the circuits themselves there are many which may be made without departing in any way from the generic spirit of the invention. There are, furthermore, many equivalents of detail which may be used. The apparatus as described has not yet been constructed and it is anticipated that when it is constructed there will be found use for a few at least of the scores of known equivalents and means for attaining the specified results in the realm of the electrical arts, particularly those arts pertaining to signalling and communication, such as the telephone and telegraph arts.

It is my belief that I have described the operations with sufficient clarity to enable anyone skilled in the arts to achieve the results claimed, with or without the aforementioned equivalents and means which he has at his command.

All these and other modifications which fall within the purview of the generic spirit are intended to be covered by the annexed claims.

What I claim is:

1. A crossing traffic control system comprising means for projecting beams of light spaced apart upon the surface of the crossing, and means for progressing said light beams over the crossing in spaced relation to define progressing traffic pockets.

2. A crossing traffic control system comprising a support erected in the vicinity of the center of the crossing, means carried by the support to project upon the pavement of the intersection, a plurality of pockets defined by beams of light, said pockets forming substantially segmental parts of a circle whose center is the center of the intersection and means for revolving the pockets about said center.

3. A crossing traffic control system comprising a support elevated with respect to the crossing, means carried by the support to project upon the pavement of the crossing a plurality of pockets defined by means of light, said pockets forming substantially segmental parts of a circle having its center in the vicinity of the crossing, and means for revolving the pockets about said center.

4. A crossing traffic control system comprising a support elevated with respect to the crossing, means carried by the support to project upon the pavement of the crossing a plurality of pockets defined by beams of light, said pockets forming substantially segmental parts of a circle having its center in the vicinity of the crossing, and means for revolving the pockets about said center, together with means to project a beam transversely of the pockets.

5. A crossing traffic control system comprising a support elevated with respect to the crossing, means carried by the support to project upon the pavement of the crossing a plurality of pockets defined by beams of light, said pockets forming substantially segmental parts of a circle having its center in the vicinity of the crossing, and means for revolving the pockets about said center, together with means to project both inner and outer transverse beams of light defining the inside and outside boundaries of the pockets.

6. A crossing traffic control system comprising a support elevated with respect to the crossing, means carried by the support to project upon the pavement of the crossing a plurality of pockets defined by beams of light, said pockets forming substantially segmental parts of a circle having its center in the vicinity of the crossing, and means for revolving the pockets about said center, together with means for projecting intermittently circles of light transversely of the mouths of the pockets.

7. A crossing traffic control system comprising means for projecting beams of light spaced apart upon the surface of the crossing, and means for progressing said light beams over the crossing in spaced relation to define progressing traffic pockets, certain of the beam projecting means differing in character from other such means whereby to differently characterize the pockets formed by the beams.

8. A crossing traffic control system comprising means for projecting beams of light spaced apart upon the surface of the crossing, and means for progressing said light beams over the crossing in spaced relation to define progressing traffic pockets, together with means to cast beams transversely of the pocket producing beams to direct traffic transversely thereof.

9. A crossing traffic control system comprising means for projecting beams of light spaced apart upon the surface of the crossing and means for progressing said light beams over the crossing in spaced relation to define progressing traffic pockets, together with traffic direction signal means indicating the crossing courses open and closed to traffic.

10. A crossing traffic control system comprising means for projecting beams of light spaced apart upon the surface of the crossing, and means for progressing said light beams over the crossing in spaced relation to define progressing traffic pockets, together with traffic direction signal means indicating the crossing courses open and closed to traffic, and central station means governing a plurality of said equipments.

11. A crossing traffic control system comprising means for projecting beams of light spaced apart upon the surface of the crossing, and means for progressing said light beams over the crossing in spaced relation to define progressing traffic pockets, together with traffic direction signal means indicating the crossing courses open and closed to traffic, central station means governing a plurality of said equipments, and provided with means to effect the operation of either such system to the exclusion of the other.

In testimony whereof I hereunto affix my signature.

JOHN P. TARBOX.